March 9, 1954 A. PITT ET AL 2,671,436
MULTIFORM INTERNAL-COMBUSTION ENGINE
Filed April 8, 1950 8 Sheets-Sheet 1

Inventors
LORNE F. KNIGHT
ARNOLD PITT
By: Fetherstonhaugh & Co.
Attys

March 9, 1954 A. PITT ET AL 2,671,436
MULTIFORM INTERNAL-COMBUSTION ENGINE
Filed April 8, 1950 8 Sheets-Sheet 2

Inventors
LORNE F. KNIGHT
ARNOLD PITT
By: Featherstonhaugh & Co.
Att'ys

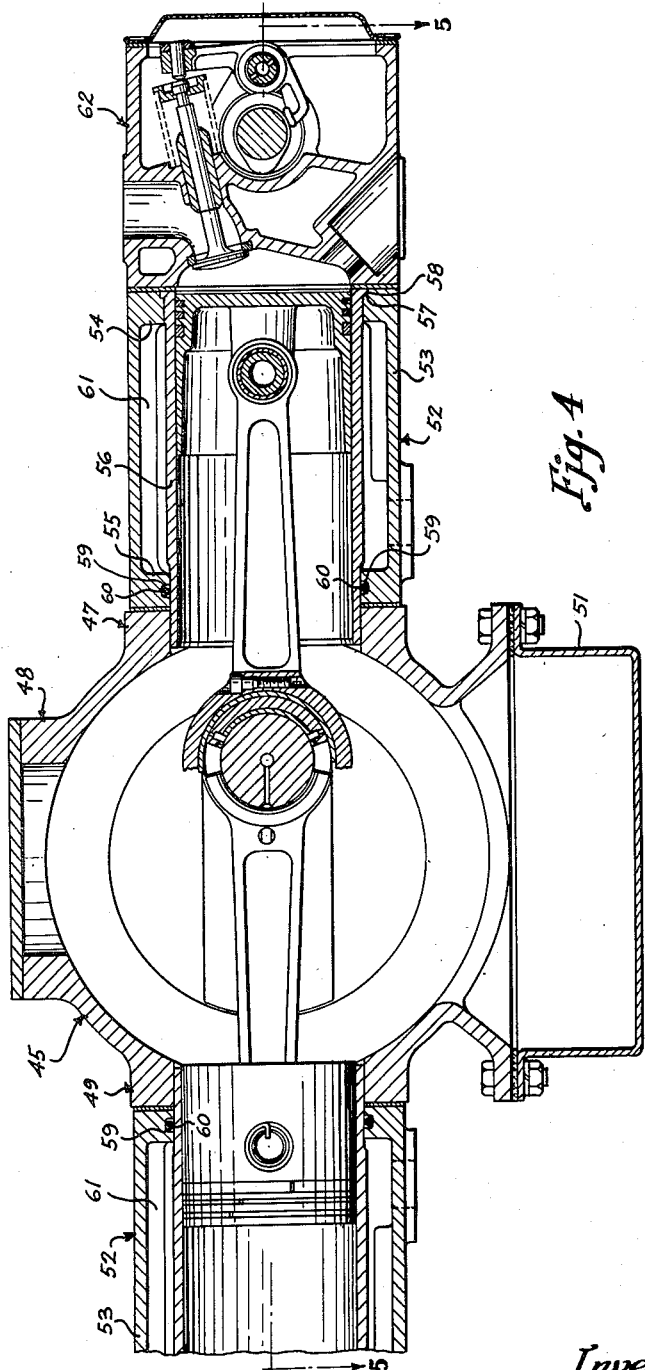

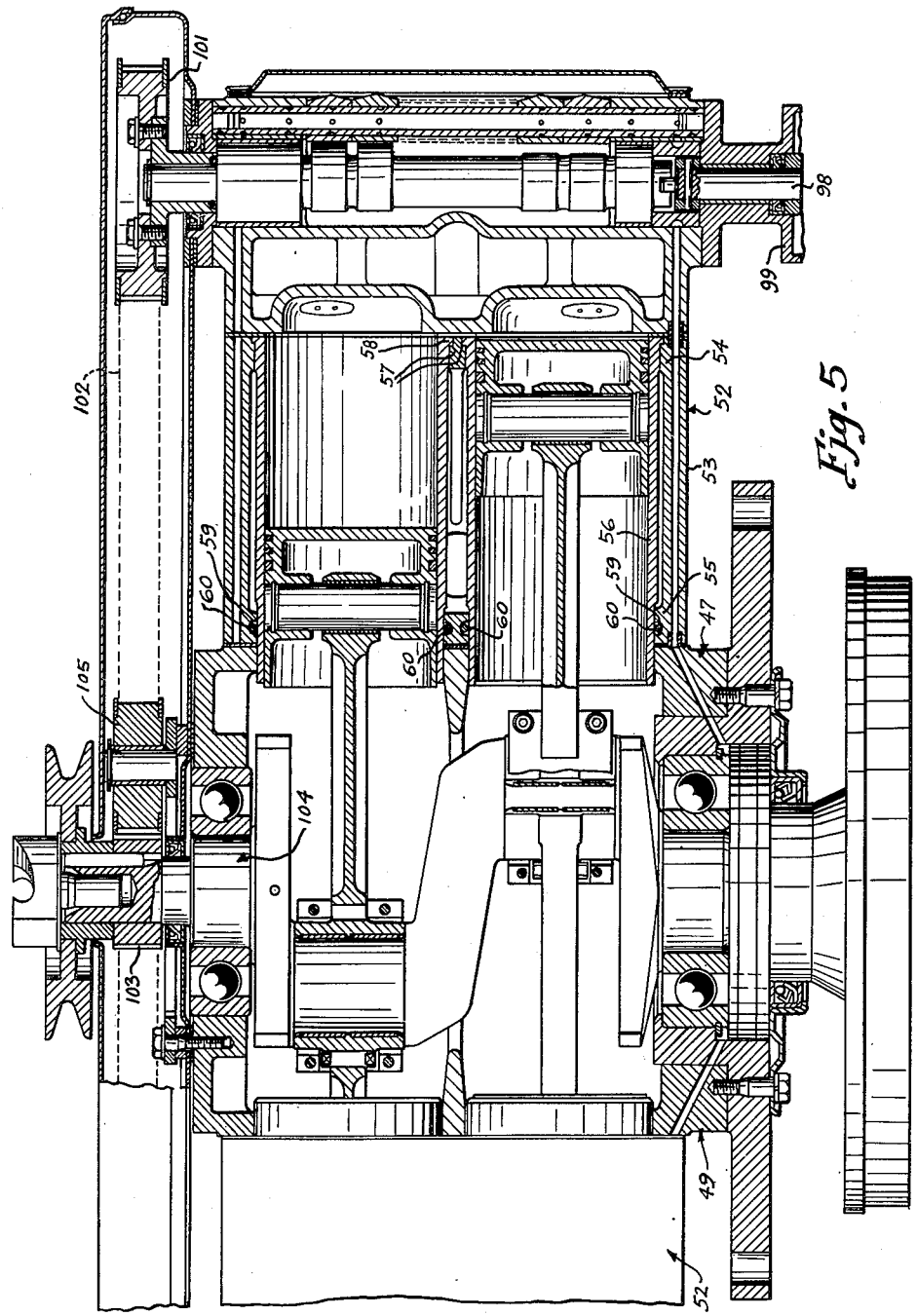

Inventors
LORNE F. KNIGHT
ARNOLD PITT
By: Fetherstonhaugh & Co.
Att'ys

March 9, 1954  A. PITT ET AL  2,671,436
MULTIFORM INTERNAL-COMBUSTION ENGINE
Filed April 8, 1950  8 Sheets-Sheet 7

Inventors
LORNE F. KNIGHT
ARNOLD PITT
By: Fetherstonhaugh & Co.
Att'ys

Inventors
LORNE F. KNIGHT
ARNOLD PITT
By: Fetherstonhaugh & Co.
Att'ys

Patented Mar. 9, 1954

2,671,436

UNITED STATES PATENT OFFICE 2,671,436

MULTIFORM INTERNAL-COMBUSTION ENGINE

Arnold Pitt, Weston, Ontario, and Lorne F. Knight, Toronto, Ontario, Canada, assignors to Massey-Harris Co., Ltd., Toronto, Ontario, Canada Application April 8, 1950, Serial No. 154,752

5 Claims. (Cl. 123—55)

This invention relates to a multi-form multi-purpose engine of the internal combustion reciprocating class.

Engines for industrial use which provide the power source for various classes of vehicles and special equipment such as electrical generators, compressors, and the like, have been available in special designs at various horsepower ratings which may be selected by the user. However, in carrying these available engine designs it is necessary for a supply house or repair depot to stock or store a large number of varying special components for each design of engine, as well as complete engines of special design for any one horsepower rating.

Of course, where the engines in question are of any one form or style such as vertical, V-type, or horizontal, then a certain degree of interchangeability of components may be afforded if particular care is exercised in the design of the components. However, in the opposed or V style of cylinder disposition of engine, the cylinders cannot be in line in the radial plane, and accordingly, it is not feasible for the cylinder heads or their component parts to be made completely interchangeable. These considerations, therefore, suggest that the cylinders should be placed in the same plane radially where the engine is of a form more multiple than the simple vertical style. It will be apparent, however, that in the radial engine, so-called, a master rod is required which necessitates special design in one cylinder whereby the cylinder components are not interchangeable as between the various cylinders by reason of the one piston having a special stroke.

This invention contemplates the derivation of engine form from the little known and heretofor unused opposed cylinder style of engine of the class shown in British Patent 451,173, January 23, 1935, of Joseph Maina. However, in the present engine the connecting rods of opposed cylinders act from a common crank pin being similar in form and interchangeable as disclosed in co-pending application Serial No. 132,328 filed December 10, 1949, issued August 26, 1952, under Patent Number 2,608,108. This is to provide for a general interchangeability of parts between the various cylinder assemblies.

It is not particularly feasible to employ splash lubrication for the large ends of a plurality of connecting rods acting from the same crank pin in a multi-form engine as herein disclosed. It is thus necessary to employ some sort of pressure lubricating system and in this respect any of the well known systems for providing lubrication through the crank shaft may be employed. In the preferred form of engine, however, relatively high compression ratios in the order of ten to one or more may be employed in which case a ball bearing mounting for the crank shaft will be necessary as a practical requirement. The problem of providing a pressure lubricating system through a crank shaft mounted on roller bearings is solved herein by the use of a rotary lubricating pump mounted directly on the crank shaft. The pump is preferably of the multiple output class.

Experiments have indicated that the manner of lubrication of the big end of the crank shaft according to the usual and standard practice in the pressure lubricating systems through the crank shaft is not in agreement in principle with that proposed herein. Whereas general practice requires pumping of the lubricant from the central regions of the crank pin outwardly in the direction of centrifugal force it has been found to be more desirable to pump the lubricating fluid inwardly in the direction of the axis of the crank shaft so that the bearing is lubricated at a minimum pressure region.

Moreover, in regard to the general engine plan the requirement of interchangeability calls for elimination of special timing gear and the like and, accordingly, a simply timing mechanism has been arrived at involving belt drive which may be employed with the same components for various engine plans aside from the detail of the timing belt itself.

It is thus a principal object of the invention to provide an internal combustion engine of the class in which the cylinders of each row are located in the same plane suggestive of the radial engine form, but in which each of the cylinders is of similar dimensional characteristics, and the connecting rods and all other duplicated components are similar and interchangeable whereby the engine is practical for relatively large scale production and a widespread field of use.

Another object of the invention to provide an engine of the above character in which each cylinder head embodies valve actuating mechanism driven by a common belt or chain operatively related to the crank shaft.

A further object of the invention is to provide an internal combustion engine having interchangeable components whereby the cylinders and heads may be applied to various forms of crank case to provide a horizontal opposed cylinder engine, a V type engine, or a simple radial type engine of general T or Y formation.

A still further object of the invention is to provide a multi-form engine of this character which may be formed in any depth in accordance with the desired length of the crank shaft. It will be observed and more fully appreciated hereinafter however, that full interchangeability may be found only in one series such as a one-row series, a two-row series, or a three-row series, although as between different series a number of components will still be interchangeable.

Further objects of the invention will be appreciated by a study of the following specification taken in conjunction with the accompanying drawings.

Figure 3A:
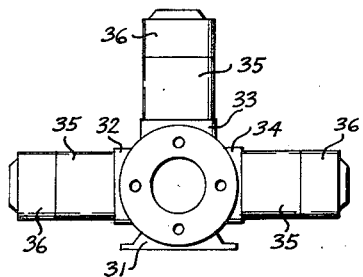

Figures 3a to 3e illustrate various engine forms which depend for their style substantially upon the design of the crank case only, aside from particular attention which may be required to the design of the connecting rods. Figure 3a shows a T-type engine; 3b a V-type; 3c a Y-type; 3d a side view of a one-row simple radial type; and 3e a design of a two-row simple radial or Y-type, wherein the cylinders and cylinder heads are of twin form.

Figure 4 is a sectional view of a horizontal opposed cylinder engine according to the invention, showing details of the cylinder and head construction and the bearing structure of the connecting rods.

Figure 5 is a sectional view on the line 5—5 of Figure 4.

Figure 3B:
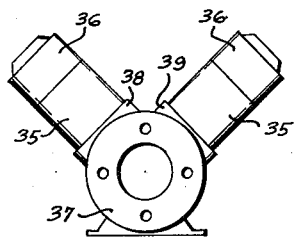
Figure 3C:
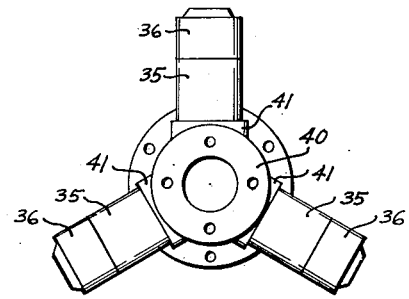
Figure 3D:
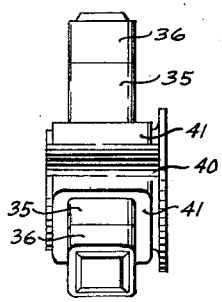
Figure 3E:
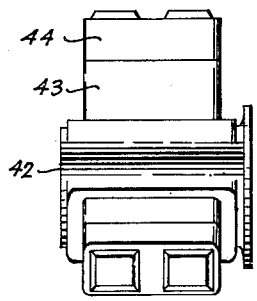
Figure 6:
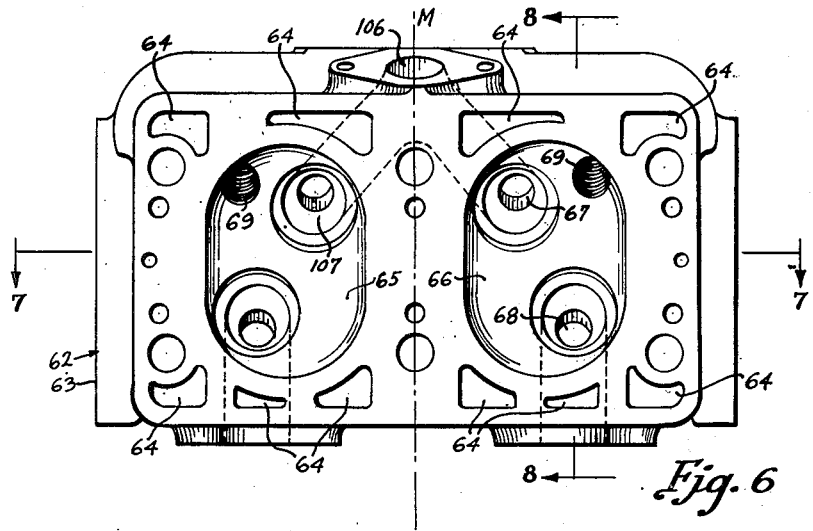

Figure 6 is a view of the inner face of a twin type combustion cylinder head for the type which may be used with the engine form illustrated in Figures 3e, 4 and 5.

Figure 7:
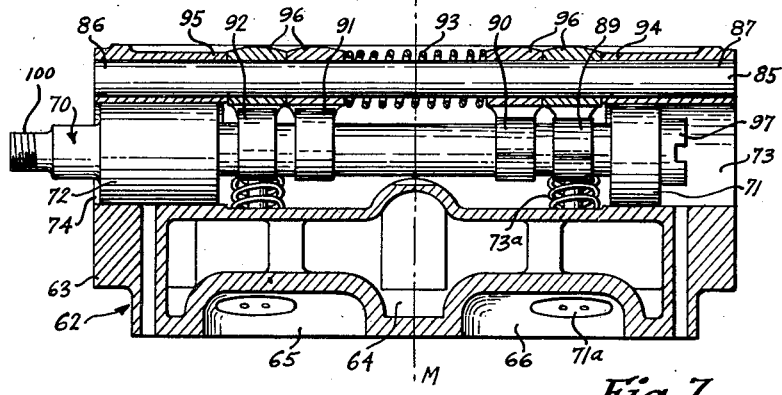

Figure 7 is a sectional view on the line 7—7 of Figure 6.

Figure 8:
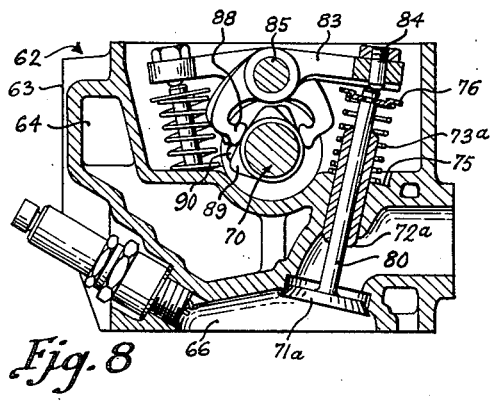

Figure 8 is a sectional view of the cylinder head on the line 8—8 of Figure 6.

Figure 9:
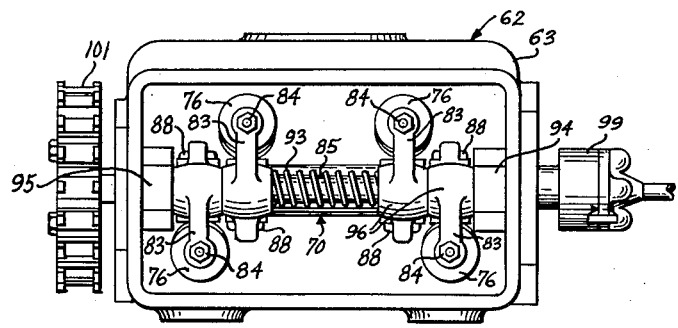

Figure 9 is a plan view of the cylinder head of Figures 6 to 8 illustrating the cam shaft drive means, cam shaft drive sprocket, and a distributor head mounted commonly on the cam shaft.

Figure 10:
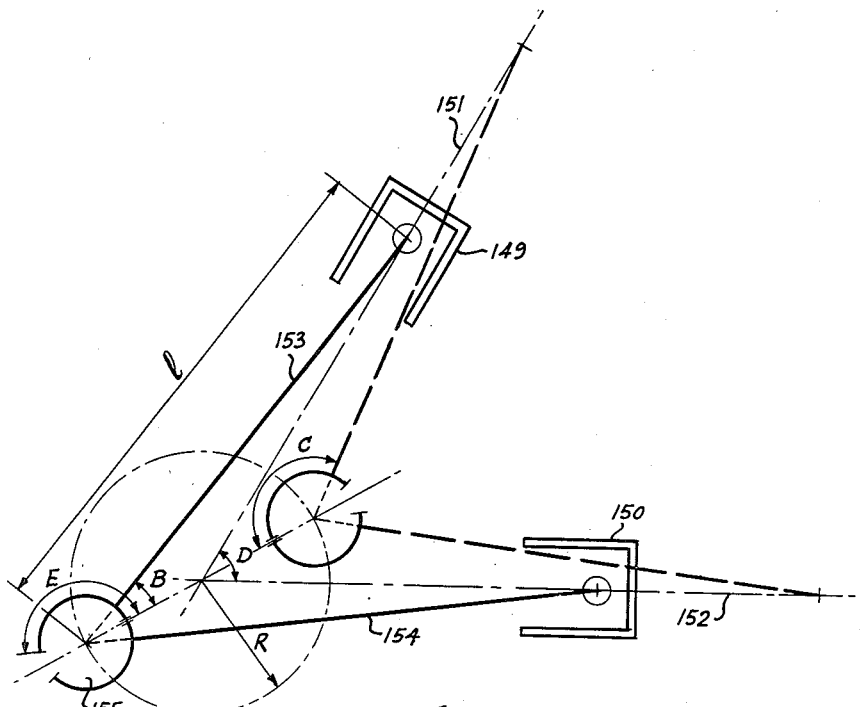

Figure 10 is a diagrammatic illustration of the general case for calculating the angular bearing extent of the bearing surfaces of the connecting rods for the general case.

Figure 11:
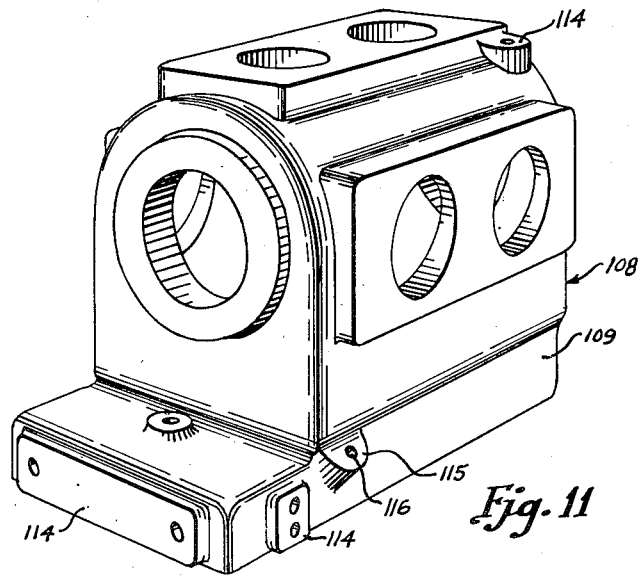

Figure 11 illustrates a preferred form of crank case for a multi-form engine of the invention wherein the crank case may be adapted to provide a twin cylinder engine of the vertical type, or an opposed horizontal engine having twin cylinders in each side, or a T-form of engine having twin cylinders making six in all, thus affording a large degree of adaptability to various engine styles in production having regard to interchangeability of the remainder of the components of the engine.

Figure 12:
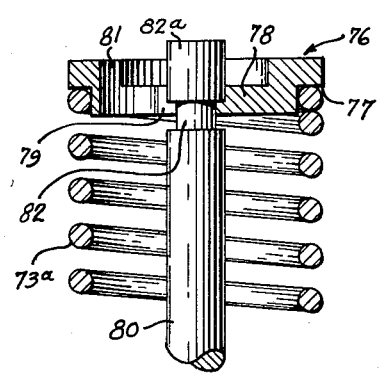

Figure 12 is a sectional view of an improved type of valve spring retaining cap.

Figure 13:
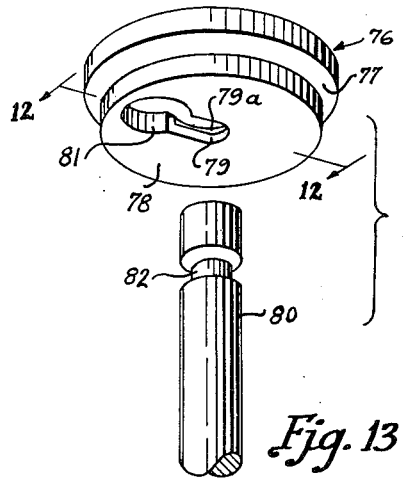

Figure 13 is a perspective view of the components of Figure 12; see also Figure 8.

Figure 14:
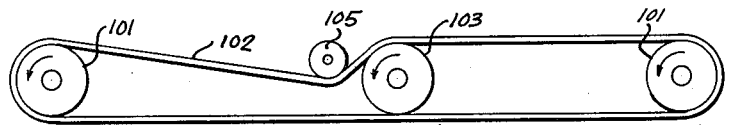

Figure 14 is a diagrammatic view of the timer belt drive for driving the cam shafts of the valve mechanisms in the cylinder heads from the crank shaft.

Figure 15:
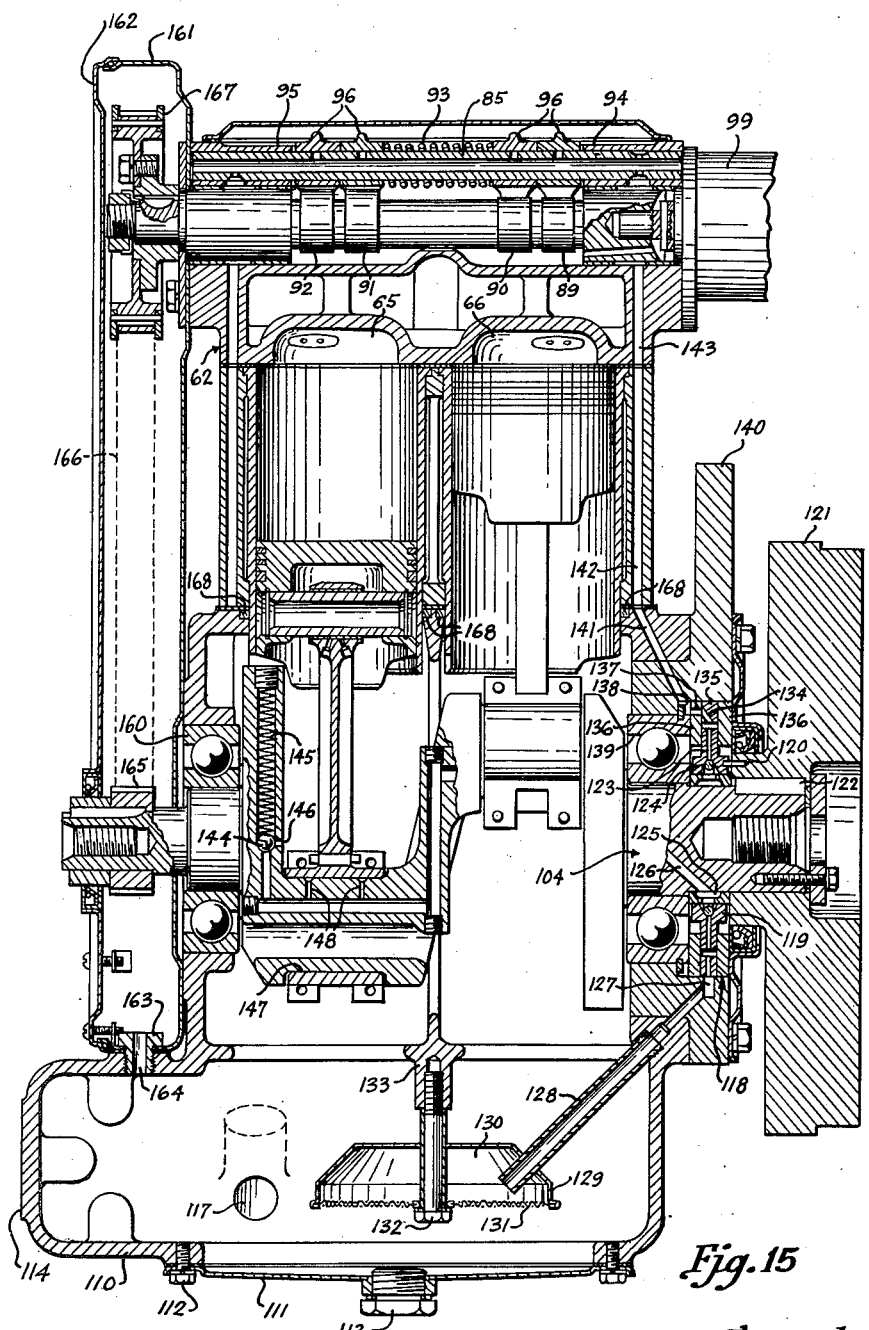

Figure 15 is a sectional view of a vertical style of engine according to the invention illustrating the method of oil feed to the connecting rod bearings in more detail and disclosing one system of providing pressure lubricant feed.

Figure 1:
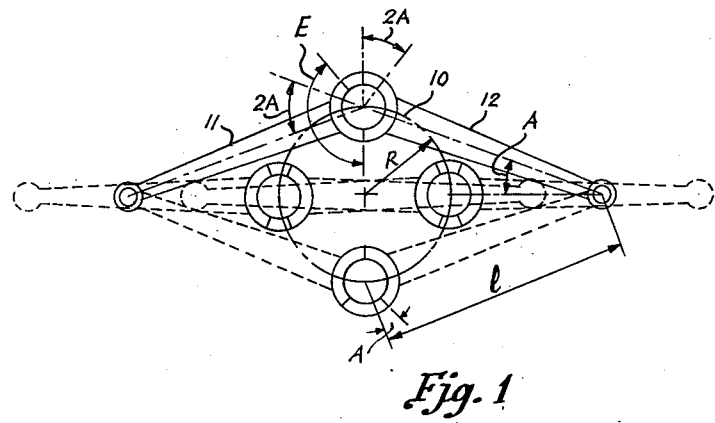
Figure 1 is a diagrammatic view of the action of the connecting rods extending from a common crank pin in an engine according to the invention but of the opposed cylinder type operating in accordance with the principles set forth in Patent 2,608,108.
Figure 2:
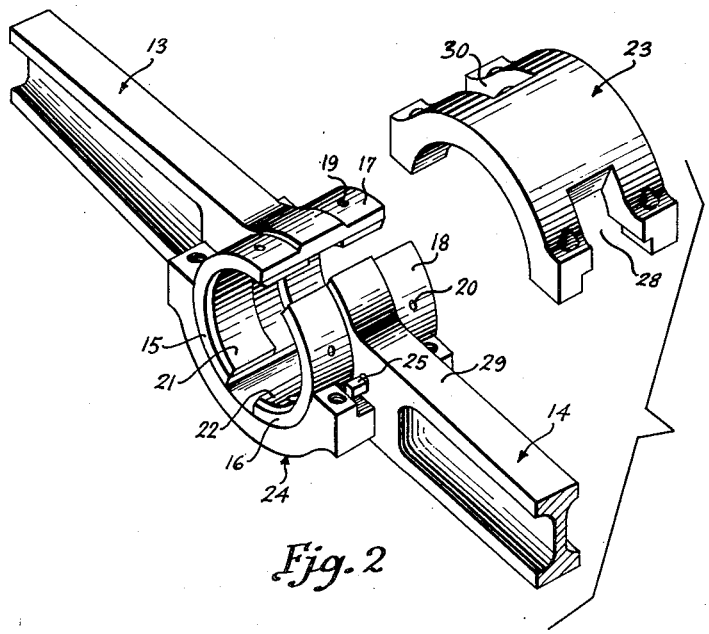
Figure 2 is a partial perspective view of connecting rods employed in an engine of the invention and formed in accordance with the teachings of the said co-pending application, showing one component of one design of the retaining means removed.

Referring to Figures 1 and 2 in particular, a connecting rod arrangement is shown wherein a plurality of such rods may be mounted on a common crank pin for operation in the same plane and wherein each of the rods embodies only a partial bearing surface. Thus, in Figure 1, the crank rod R has a path 10 which is a common path of action for both the connecting rods 11 and 12. In the position of rods shown in bold lines, it will be observed that the rods are disposed at an angle A which is a maximum at this position. The arcuate length E of the bearing hub at the crank pin end of each connecting rod is equal to the theoretical value $$E = 180° - 2 \sin^{-1} \frac{R}{1}$$

where R is the crank radius, and 1 is the distance between the pivotal centres of the connecting rod. The value E in all cases is less than 180° and is reduced in practice to allow a clearance dimension. In practical form, the arrangement may embody the connecting rods 13 and 14 shown in Figure 2 which have their crank pin bearing hubs 15 and 16, respectively, formed to extend arcuately to present a bearing surface of limited area to the crank pin. Each bearing hub has an outer surface as at 17 and 18 in communication by suitable oil ducts 19 and 20 with the inner bearing liners 21 and 22, the ducts passing through the liners into communication with the bearing surfaces of these bearings. The bearings may be of conventional form or of a modified oil cushioning form disclosed hereinafter with reference to Figure 10. In the arrangement shown, however, the retaining surfaces 17 and 18 are movable within suitable retaining means such as the retaining or clamping components 23 and 24. Each of the latter is cut away as at 28 to allow passage of the arm portion 29 of the rod 14, but the stud 25 serves to limit movement of the rod 14 within the retaining means 23 and 24 when the latter are clamped together about the hub portion of the rod.

The other rod 13 is slidable within the retaining means rotatable with respect to the rod 14 by reason of the larger cut-away portions 30 allowing more movement. The retaining means 23 and 24 may be fastened together by suitable socket head screws (not shown) to mount the bearing hubs of the rods on a connecting pin. In employing commonly mounted and similar connecting rods of this character various engine arrangements are available. Thus, referring to Figures 3a to 3e, it will be observed that in Figure 3a the crank case 31 has three mounting hubs 32, 33 and 34 disposed at right angles to one another, each of these hubs carrying similar cylinders 35 having similar cylinder heads 36 thereon. This arrangement will give a T-form of engine. Obviously, however, the hub 33 may be covered by a suitable plate to leave a simple horizontal form of engine of the opposed cylinder class. Also, if desired, the two side hubs 32 and 34 can be covered, is which case a vertical engine would be provided which may be single or multi-cylinder and which may employ connecting rods of conventional style.

A V-form engine is shown in Figure 3b wherein the crank case 37 has cylinder hubs 38 and 39 disposed to provide a V disposition of the cylinders 35.

A simple radial form engine is shown in Figure 3c wherein the crank case 40 has cylinder hubs 41 thereon disposed 120° apart to mount the cylinders 35 thereon.

The engine form may be extended lengthwise in the direction of the axis of the crank shaft, the single form being illustrated as a side view of Figure 3c in Figure 3d. The engine may be of twin form or two-row, the latter being the usual terminology in referring to radial engines, and in such instance the crank case 42 is of extended length to accommodate the twin cylinders 43 having twin heads 44 thereon.

For the purpose of illustrating the invention in further detail, reference shall be had to Figures 4 and 5 which illustrate an opposed cylinder engine built on one style of crank case designed for a twin type engine of two rows of cylinders in length.

In Figures 4 and 5 an opposed cylinder engine according to the invention and having one style of crank case 45 has cylinder mounting hubs 47, 48 and 49 embodied in the latter 90 degrees apart radially. In the style of crank case shown in Figure 4 a suitable oil pan 51 may be mounted thereon. Preferably, however, the oil pan is incorporated in the casting of the crank case according to a modification hereinafter disclosed in more detail with reference to Figure 11.

In Figures 4 and 5 twin type cylinders 52 are shown mounted on the cylinder mounting hubs 47 and 49, each twin cylinder comprising a casting having outer walls 53 with inwardly extending flanges 54 and 55 at the upper and lower termini thereof serving to mount cylinder liners 56. The flange 54 has a small step 57 designed to receive a lip 58 on each of the cylinder liners, the latter extending downwardly and relatively freely past the flange 55. The interface between the flange 55 and the cylinder liner is sealed by means of a suitable sealing device such as a suitable packing ring 60 disposed in the annular recess 59. In this way the chamber 61 extending about the walls of the cylinder liner as defined by the walls 53 of the cylinder casting in spaced apart relation thereto is effectively sealed.

The cylinders 52 are similarly dimensioned and are interchangeable. Each carries a similar cylinder head 62 of the twin type shown in detail in Figures 6 to 9.

The head comprises a casting 63 having suitable water cooling passages which are in communication with the water cooling passages 61 of the cylinder by ports 64 substantially in accordance with conventional teachings. A pair of firing chambers 65 and 66 are formed in the head having intake and exhaust valve openings 67 and 68 and a spark plug opening 69. It is of particular interest to note that the valve cam shaft 70 is mounted by enlargements 71 and 72 adjacent the ends thereof within the enlarged bores 73 and 74 of the casting in a position adjacent the valves and tappets.

In discussing the actuation of the valves, reference will be made to the valve mechanism pertinent to the firing chamber 66 and thus, in Figure 8, it will be observed that the exhaust valve 71a is slidably mounted within a sleeve 72a press fit within a suitable bore in the casting. The valve is normally biased for closure by a compression spring 73a rising from the spring seat 75 formed in the casting and exerting spring pressure against the spring retaining cap 76. As illustrated in Figures 12 and 13, the valve retaining cap has spring retaining flanges 77 in stepped relation to the main body 78 thereof forming a recess for the spring. The body has a small hole 79 therein designed to accommodate a reduced diametric portion of the shaft 80 of the valve 71a. The enlarged opening 81 serves to allow passage of the true diameter of the shaft 80 so that the cap may be brought down over the shaft of the valve member against the compression of the spring and then move laterally to cause the small hole 79 to fit about the reduced diametric portion 82 of the valve shaft 80. A recess 79a is formed as a seat for the head 82a of the stem 80 whereby the latter is locked in its axial position within the body under pressure of the spring 73a.

A conventional tappet arrangement in the form of a bell crank arm 83 is provided having suitable adjusting means 84, the tappet being mounted on a tappet shaft 85 journalled at its ends in the casting as at 86 and 87. The tappet has a cam foot 88 designed to ride on the cam 89 which is one of a series of cams, the remainder of which are designated by numerals 90, 91 and 92. The tappet arms are held in proper spaced relationship by a suitable compression spring 93 which serves to space the pairs of tappets for each cylinder against suitable abutments 94 and 95 formed in the casting. It will be observed that the tappet arms in the region of their mounting on the shaft 85 embody enlargements 96 serving to space each tappet from the next.

It is particularly important to observe that the cylinder head in its formation is substantially a mirror image about the transverse medial line M whereby the components thereof are interchangeable one with the other requiring no special design considerations as between different tappets or valves in production. The cam shaft 70 at one end may include a socket member 97 designed to engage with a spindle 98 (Figure 5) driving an electrical high-tension distributor 99 (Figure 9) which serves both spark plugs of the cylinder head. The other end of the cam shaft may have threads 100 mounting the sprocket 101 (Figure 9, Figure 5) which is driven by a suitable belt 102 from a sprocket 103 mounted on the crank shaft 104 (Figures 5 and 14).

In Figure 14 the arrangement is more clearly illustrated diagrammatically where it will be observed that an idler 105 is positioned to ensure the necessary tension in the belt.

The preferred design of cylinder head according to the invention embodies a specific form of intake manifold shown in detail in Figure 6 wherein the common passage 106 branches out within the casting to communicate with the intake valve openings 67 and 107. This has been found to be advantageous where the head is made of a material having a high heat conductivity and avoids many of the disadvantages found with exterior intake manifolds serving a plurality of cylinders. The heat in the intake passages in the head is sufficient to substantially obviate any tendency of the incoming mixture to cling to the walls of the passages. On the other hand, the cooling passages are associated sufficiently close that undue heat in the intake passages does not occur to cause the intake mixture to expand unduly as it passes through the passages into the combustion chambers 65 and 66.

Having regard to the foregoing it will be apparent that the engine form may be modified by mounting the cylinders and appendages thereof in various arrangements on the crank case. It is therefore pertinent to discuss the assembly of a vertical style of engine with components previously disclosed. The lubricating system applying to all various types will also be discussed in reference to Figures 11 and 15.

In Figure 11 the preferred form of crank case is shown comprising the crank case portion 108 having therebelow and integrally formed therewith the lubricant reservoir or oil pan portion 109. As will be observed in referring also to Figure 15, a portion of the bottom wall 110 of the pan is cut away and a bottom cover 111 is mounted thereon by suitable bolts 112. A draining plug 113 of conventional form is mounted in the cover 111. A plurality of bosses 114 having suitable threaded holes are formed on the crank case at convenient points whereby the latter may be mounted on an engine frame. The boss 115 has a hole 116 through which the oil level gauge may be inserted to determine the level of oil in the pan. Oil may be poured into the pan by way of the opening 117 which incorporates a conventional spout extending exteriorly of the pan (not shown).

The lubrication of the engine embodies a pressure system including an eccentric type multiple output pump 118. In regard to the lubricating system and the mounting of the crank shaft similar components are employed in the disclosures of Figures 5 and 15. Referring to the latter figure, the pump 118 comprises a rotor 119 driven by pin connection 120 to the fly wheel 121, the latter being keyed as at 122 to the crank shaft 104. The rotor has inwardly extending passages 123 which in the present case are sealed by a resilient ring-like member 124 serving as a valve. Upon predetermined pressure build-up the member 124 will be deflected and the oil will pass to the annular chamber 125 and thence to the inner passage 126 of the crank shaft. Oil is fed to the pump and the inlet chamber 127 thereof by the intake tube 128 which extends through the filter thereof by the intake tube 128 which extends through the filter crown 129 in the oil pan 109 to a chamber 130 having a lower wall defined by the screen 131, this assembly being mounted by a suitable bolt 132 to a bridge 133 in the crank case casting.

The pump 118 also delivers lubricant outwardly thereof as by the passage 134 in the outer stator ring 135. One of the stator side walls 136 has a series of ports 137 communicating with an annular chamber 138 formed by clearance of the ball bearing 139 with the mounting flange 140 whereby the passage 141 may conduct the oil to the passage 142 in the side walls of the cylinders, thence by passage 143 to the valve mechanism.

In lubricating the crank shaft, oil feed pressure is controlled by the check valve 144 under spring pressure 145. Note that the check valve is located on the axis of the crank shaft to avoid the effects of centrifugal force. The outlet of the valve is positioned at 146, the arrangement allowing predetermined pressure in the pressure lubricating system of the crank shaft, the excess being spilled into the oil pan.

In distinction to previous suggested arrangements it is contemplated herein to cause the lubricant to be fed to the surfaces of each crank pin 147 by passages 148 which extend inwardly toward the axis of the crank shaft. Under the pressure conditions attending this construction it will be observed that the lubricant is allowed to flow over the bearing surfaces at a point of minimum pressure thereon occuring at bottom dead centre of piston movement. Immediately thereafter these surfaces are subjected to a quick application of load due to the momentum of the piston as the latter is reversed in its movement to start on the upward stroke. At this moment there will be plenty of lubricant to spread under the shock whereby an efficient wedge action is accommodated. Thus, by locating the passages 148 at a point of minimum load on the surfaces of the crank pin a number of advantageous characteristics result.

As noted previously in respect to the opposed style of engine described with reference to Figure 1, the bearing area of each crank pin will in all cases have an arcuate extent less than 180° for the general case. In determining the value of E as between any two adjacent cylinders it is necessary to take into account the angle between the line of action of the cylinders.

Thus, referring to Figure 10, the pistons 149 and 150 acting along the cylinder axis lines 151 and 152 respectively join by their connecting rods 153 and 154 to a common crank pin 155. As before, set E as the arcuate value of the bearing surface where $$E = B \text{ min.} + C \text{ min.}$$

The angle between the lines of action 151 and 152 of the cylinders is D.

The equation desired is determined by considering that position of the connecting pin 155 which gives a minimum included angle between the connecting rods when moving on a path of radius R as indicated in the lower left hand portion of Figure 10, whence, $$B \text{ min.} = \frac{D}{2} - \sin^{-1}\left(\frac{R}{1} \sin \frac{D}{2}\right)$$

The angle C is found by setting the value of D in the above equation equal to 360° −D. Thus, $$C \text{ min.} = 180° - \frac{D}{2} - \sin^{-1}\left(\frac{R}{1} \sin \frac{D}{2}\right)$$

For the case of the two pistons shown therefore, $$E = B \text{ min.} + C \text{ min.} = 180° - 2 \sin^{-1}\left(\frac{R}{1} \sin \frac{D}{2}\right)$$

In a special case of opposed pistons in the same plane, sin $$\frac{D}{2}$$

is equal to 1 and E equals $$180° - 2 \sin^{-1}\frac{R}{1}$$

Where more than two pistons connecting to the same crank pin are considered, then it is merely necessary to calculate values of B between adjacent cylinders, in which case $$E = B_L \text{ min.} + B_R \text{ min.}$$

Thus, one finds the values of B min. to the left and right of the connecting rod toward adjacent cylinders on either side of the same will give the value desired. In this way, also, the arm of the connecting rod is determined in its location relative to the bearing surface.

It will be observed that the crank shaft 104 is mounted on ball bearings 139 and 160 and that a pressure lubricating system is nevertheless employed. This is accomplished by employing the rotary pump 118 which in itself effects the necessary seals about the bearing 139 while serving in the pumping action. It is desired that the excess lubrication of the bearing 160 derived from oil mist effected by the running of the engine be allowed to spill into the outer casing 161. A cover 162 extends over the casing whereby the excess oil is confined and conducted to an oil return plug 163 having the passage 164 leading into the oil pan. The sprocket 165 in driving engagement with the timer belts 166 to the timer wheel or gear 167 of the valve mechanism is enclosed by the casing 161 and cover 162. The material for the belt 166 must of necessity be oil-resistant in its nature and yet pliable. Certain of the synthetic rubber-like plastic materials incorporated about a fibrous base wherein the fibrous material such as fine steel wire aligned in the direction of belt tension will provide a satisfactory belt. In such case the inner surface of the belt should incorporate cross bar portions in the form of lateral stud-like projections which engage in suitable receptive surfaces of the sprockets such as sprocket 101 of Figure 9.

It will be evident upon comparing the constructions of Figures 5 and 15 that certain minor details are different. It will be appreciated that such details as are different are not indicative of changes required as between the two styles of engines shown, but rather are to be considered as general alternative only. In any case, these details are not a specific part of this invention but belong to the design phase of the engine such as the placement of the seal 55 shown in Figure 5 below the cylinder walls and designated at 168 in Figure 15. The latter placement of the seal in the upper region of the crank case about the openings for the cylinders is preferred. The specific manner of mounting the drive connection for the cam shaft in the valve mechanism and connection to the distributor including specific arrangements of components about the rotor pump aside from such details as have been specifically discussed in regard to their pertinence to the invention are subject to considerable modification aside from such as may affect operation and interchangeability of components in accordance with this disclosure.

Whereas previously it was necessary for the manufacturer to modify designs in respect to numerous detailed components in order to provide different horsepowers and styles it is possible according to the present proposals to supply various horsepowers and styles providing a decision is made in respect to the axial depth of the engine. Even assuming engines of different axial depth, that is as appearing in Figures 3d and 3e, to be contemplated many of the components will still be interchangeable. One of the most desirable forms is the two-cylinder twin type as a basis for axial depth as shown in Figures 3e, 5 and 15, whereby engines may be assembled from horsepower ranges extending from eight horsepower upwardly through the range which includes those most commonly employed for driving of combines, tractors, pumps, compressors, small hoists, and the like.

What we claim as our invention is:

1. In an internal combustion engine, the combination of: a crank case; a plurality of cylinder openings in said crank case having their axes contained in a common plane at right angles to the axis of the crank case; a second series of identical cylinder openings in said crank case, the theoretical axes of which are contained in a common plane parallel to said first common plane but spaced from the latter in the axial direction of said crank case, said spaced apart cylinder openings being positioned in line in the direction of the axis of said crank case; a crank shaft having a crank pin for each of said series of cylinder openings; similar connecting rods for each of said series of cylinder openings adapted to be commonly connected to the corresponding crank pin thereof; engine cylinders mountable in said cylinder openings which are in line; a cylinder head adapted to be reversably positioned on said cylinders; valve mechanism in said cylinder head including a rotatable cam shaft disposed parallel to said crank shaft; and timing drive means operatively connecting said crank shaft and said cam shaft for driving the latter and said valve mechanism.

2. In an internal combustion engine, the combination claimed in claim 1 in which said timing drive means is operatively connected to one end of said cam shaft; and an electrical high tension distributor for said cylinder head mounted thereon and including means in drive connection with the other end of said cam shaft.

3. In an internal combustion engine, the combination claimed in claim 1; cam means on said cam shaft disposed in groups equidistant from a medial line therebetween; a projection for drive connection on the driven end of said crank shaft; and means for reversably mounting said cam shaft in said cylinder head to position the medial line thereof in alignment with the medial line of said head at which said projection extends beyond said cylinder head.

4. In an internal combustion engine, the combination claimed in claim 1; cam means on said cam shaft disposed in groups equidistant from a medial line therebetween; a projection for drive connection on the driven end of said crank shaft; means for reversably mounting said cam shaft in said cylinder head to position the medial line thereof in alignment with the medial line of said head at which said projection extends beyond said cylinder head; a tappet shaft in said head in close parallel spaced apart relationship to said cam shaft; a plurality of identical tappet arms on said shaft positioned to engage said cam; and means including enlargements on said tappet arms for maintaining the latter in predetermined spaced apart relationship and in engagement with said cams.

5. In an internal combustion engine, the combination claimed in claim 1 in which said timing drive means comprises pulleys on said cam shaft and said crank shaft and an endless belt extending between said pulleys for drive connection therebetween.

ARNOLD PITT.
LORNE F. KNIGHT.

References Cited in the file of this patent

UNITED STATES PATENTS

| Number | Name | Date |
|---|---|---|
| 1,046,392 | Kessler | Dec. 3, 1912 |
| 1,264,708 | Stork | Apr. 30, 1918 |
| 1,271,354 | Nus | July 2, 1918 |
| 1,274,813 | Sullivan | Aug. 6, 1918 |
| 1,276,891 | Felix | Aug. 27, 1918 |
| 1,367,194 | Le Franc | Feb. 1, 1921 |
| 1,370,503 | MacFarren et al. | Mar. 1, 1921 |
| 1,889,583 | Woolson | Nov. 29, 1932 |
| 1,993,992 | Ford | Mar. 12, 1935 |
| 2,010,183 | Furay | Aug. 6, 1935 |
| 2,111,828 | Weaver et al. | Mar. 22, 1938 |
| 2,140,085 | Maina | Dec. 13, 1938 |
| 2,452,232 | Fischer | Oct. 26, 1948 |
| 2,511,823 | Klotsch | June 13, 1950 |

FOREIGN PATENTS

| Number | Country | Date |
|---|---|---|
| 487,430 | France | Apr. 10, 1918 |
| 535,255 | Great Britain | Apr. 3, 1941 |
| 560,287 | Great Britain | Mar. 29, 1944 |